Dec. 6, 1927. Re. 16,813
P. A. HILLIARD
MACHINE FOR PREPARING CHOCOLATE FOR CONFECTION COATINGS
Original Filed May 6, 1925 2 Sheets-Sheet 1
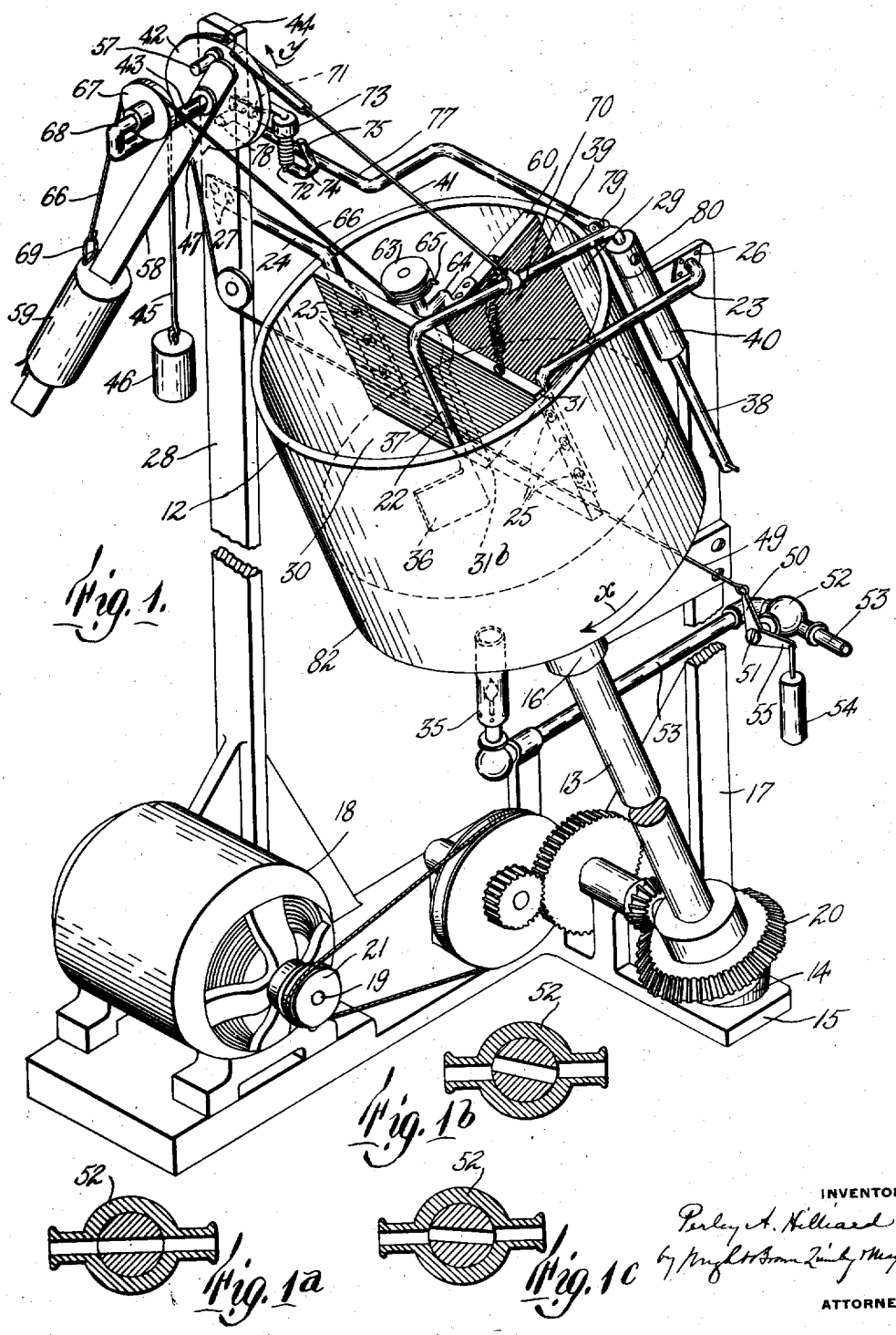
INVENTOR
Perley A. Hilliard
by Wright Brown Quinby & May
ATTORNEYS Dec. 6, 1927. Re. 16,813
P. A. HILLIARD
MACHINE FOR PREPARING CHOCOLATE FOR CONFECTION COATINGS
Original Filed May 6, 1925 2 Sheets-Sheet 2
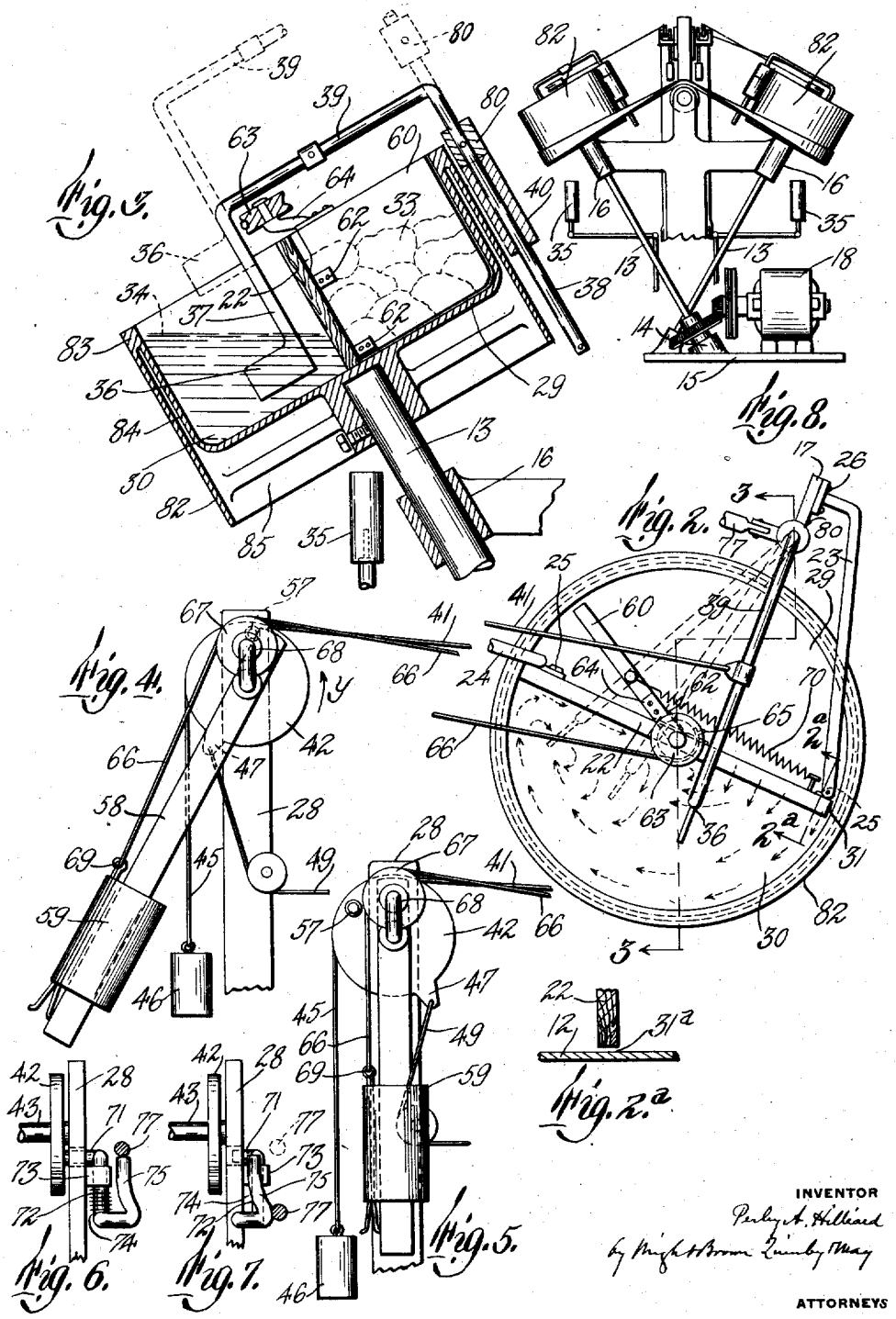
INVENTOR
Perley A. Hilliard
by Wright Brown Quinby & May
ATTORNEYS Reissued Dec. 6, 1927. Re. 16,813

UNITED STATES PATENT OFFICE.

PERLEY A. HILLIARD, OF WOLLASTON, MASSACHUSETTS.

MACHINE FOR PREPARING CHOCOLATE FOR CONFECTION COATINGS.

Original No. 1,573,832, dated February 23, 1926, Serial No. 28,559, filed May 6, 1925. Application for reissue filed December 27, 1926. Serial No. 157,391.

The object of this invention is to simplify and improve the manufacture of certain articles of confectionery consisting of a center coated with a layer of semi-liquid which later becomes solid, notably chocolates and bonbons, so called.

For convenience, I will hereinafter refer to the material used as a coating, as "chocolate," with the understanding that I mean thereby any material that behaves in substantially the same manner as chocolate, and that is to be prepared by the machine in which my invention is embodied.

Heretofore the preparation of chocolate for confection coatings has required the use of a plurality of separate containers, with the handling incidental to the transfer of the chocolate from one container to another. In the machine of my invention only one container is employed, and the heat supplied is automatically regulated, so that the operator does not have to guess at the degree required, avoids liability of either excessively or insufficiently heating, and is enabled to leave the machine to perform its function for a considerable time without the oversight of the operator.

A further advantage of my improved machine is the saving of the operator's time, because no hand stirring of the chocolate is required; the machine being adapted to continuously and automatically stir the chocolate.

Of the accompanying drawings forming a part of this specification,—

Figure 1 is a perspective view of a machine embodying the invention.

Figures $1^a$, $1^b$ and $1^c$ are sectional views, showing different adjustments of the gas cock hereafter described.

Figure 2 is a top plan view of the kettle, showing portions of the mechanism cooperating therewith.

Figure $2^a$ is a fragmentary section on line $2^a$—$2^a$ of Figure 2.

Figure 3 shows in section parts intersected by the line 3—3 of Figure 2, the lever portion of the rod, hereinafter described, and the blade thereon, being shown in elevation.

Figures 4, 5, 6 and 7 are fragmentary views, showing details hereinafter described.

Figure 8 shows in elevation a twin machine, in which the invention may be embodied.

The same reference characters indicate the same parts in all of the figures.

In the drawings, 12 designates a cylindrical kettle, fixed to and rotated by a shaft 13, coaxial with the kettle, and supported in an inclined position by a lower step bearing 14, on the base portion of a supporting frame 15, and an upper bearing 16, fixed to an upright 17, forming a portion of the frame. The shaft and kettle are rotated in the clockwise direction indicated by arrow X, by a suitable motor 18, mounted on the frame base, and a torque-transmitting connection between the motor shaft 19 and the kettle shaft.

Figure 1 shows a suitable embodiment of said connection, including a bevel gear 20, fixed to the kettle shaft, and a pulley wheel 21, fixed to the motor shaft, the intermediate members of the connection being so clearly shown that further description is unnecessary.

Within the kettle is a fixed partition or divider 22, supported by arms 23 and 24, attached to opposite ends of the divider by fasteners 25. The arm 23 is attached by fasteners 26, to the frame upright 17, and the arm 24 by fasteners 27, to another frame upright 28. The divider 22 separates the kettle into two compartments 29, 30 which are adapted respectively to hold the solid and the melted chocolate. The kettle being mounted on an inclined axis as shown, the solid chocolate compartment is preferably arranged to be located at the upper side of the kettle, the compartment having the pool of melted chocolate being at the lower side. The ends and the lower edge of the divider are in close proximity to the surfaces of the wall and bottom of the kettle.

The end edge and portion of the bottom edge of the divider 22 which are adjacent to the portions of the inner surface of the rotating kettle moving from the compartment 29 to the compartment 30 are spaced therefrom as by crevices 31, $31^a$ (Figures 2, $2^a$). The end edge and portion of the bottom edge of the divider which are adjacent to the surfaces of the kettle moving from the compartment 30 to the compartment 29 are in scraping contact with said surfaces. As a result of this construction, the moving surface of the kettle coming in contact with the solid chocolate is coated with chocolate melted on the surface of the lumps or chunks in the compartment 29, and carries the coating of melted chocolate through the crevices 31, 31[a] to the compartment 30 where the coating is blended into the pool of melted chocolate therein. The inner surface of the kettle as it leaves the compartment 30 is scraped by the edges of the partition 22 so that it is substantially free of chocolate when it again rubs over the chunks of solid chocolate in the compartment 29.

The kettle may be heated by any suitable means such for example as the Bunsen burner illustrated. The heat from the heating unit is intended to be applied in such a way as to melt the solid chocolate directly to the desired consistency for dipping and to maintain the melted chocolate constantly at that consistency.

I provide automatic heat-controlling mechanism for so regulating the heating flame as to maintain the melted chocolate at a substantially uniform predetermined viscosity, said mechanism being caused by excessive stiffness of the melted body 34 to increase the heat, and by excessive fluidity of said body to decrease the heat.

A preferred embodiment of said mechanism will now be described.

36 designates a blade fixed to an end portion 37 of a bent lever or rod. The opposite end portion 38 of said rod is journaled to turn in a fixed bearing 40. The blade is located in the lower compartment 30 and is immersed, when the machine is in operation, in the melted body 34, as shown by Figure 3. To the intermediate or lever portion 39 of the rod is secured one end of a cable 41, the other end of which is secured to a disk 42. The disk is mounted to turn on a horizontal arm 43, fixed to the frame upright 28. To the periphery of the disk 42 is secured at 44, a cable 45, supporting a weight 46, having a tendency to turn the disk in the direction of the arrow *y*. The disk is provided with a radially projecting arm 47, connected by a cable 49 with an arm 50, fixed to the stem 51 of the plug member of an ordinary gas cock, the casing 52 of which is shown by Figure 1, said cock being in a pipe line 53, which supplies gas to the burner 35. A weight 54 suspended from another arm 55, fixed to the plug stem, is adapted to turn the plug member toward its closed position.

The disk 42 is provided with a latterally projecting stud 57, which bears against the shorter arm of a lever 58, mounted to swing on the arm 43. On the longer arm of the lever 58 is a weight 59, which has a tendency to press the shorter arm of the lever against the stud 57, and thus turn the disk 42 in the direction of the arrow *y*.

Within the lump-receiving compartment 29 is a swinging gate 60, connected at one end by hinges 62 (Figure 3) with the mid-length portion of the fixed divider 22, its opposite end and lower edges being in close proximity to the wall and bottom of the kettle. A capstan 63, coaxial with the hinges 62, is fixed to an arm 64, which in turn is fixed to the gate 60, the capstan being turned by swinging movements of the gate. Connected at 65 with the capstan is a cable 66, passing over a loose pulley 67, journaled on an arm 68, which is fixed to the arm 43. The cable 66 is fixed to an ear 69 on the weight 59.

A spring 70, connected with the divider 22, and with the gate 60, tends to swing the gate to the right from the position shown by Figure 1, and thus press the gate against an accumulation of lumps 33, placed in the compartment 29, at the right of the gate.

The blade 36 may be raised from the kettle, as shown by dotted lines in Figure 3, by sliding the lever arm portion 38 upward in the guide 40.

To confine the disk 42 against rotation, for a purpose hereinafter described, when the blade 36 is raised, I provide a brake adapted to bear frictionally on one side of the disk, and brake-operating means actuated to apply the brake when the blade is raised, and to release the brake, when the blade is depressed.

The said brake and operating means, as here shown, includes a bent rod, having an end portion 71 (Figures 1, 6 and 7), movable in a slot in the upright 28, into and out of contact with the disk 42, an upright portion 72, journaled in a fixed bearing 73, a spring 74, fixed at one end to the bearing, and at its other end to the portion 72, and an inclined curved portion 75, fixed to the portion 72.

The end portion 71 constitutes the brake, and the portions 72 and 75, and the spring 74 constitute the elements of the operating means. Another element of said means is a bent rod 77, having at one end a pintle 78, journaled in a socket in the upright 28, the rod being thus adapted to swing vertically. The opposite end of the rod 77 is connected by a hinge 79 (Figure 1) with a collar 80, fixed to the lever-arm journal 38. The arrangement is such that when the blade 36 is depressed, the rod 77 bears on the lower end of the inclined portion 75, as shown by Figure 7, and holds the brake 71 out of contact with the disk 42. When the blade is raised, the rod 77 is swung upward above the inclined portion 75, as shown by Figure 6, whereupon the spring 74 acts to turn the upright portion 72 in its bearing, and thus press the brake 71 against the disk.

The kettle is provided with an annular flange 82, joined by a neck 83 with the upper edge of the kettle, and projecting downward below the bottom of the kettle. The higher portion of the flange 82 is separated from the kettle wall by an annular air space 84. The lower portion of the flange forms an air space 85, which receives hot air from the burner 35, and communicates with the annular space 84, as shown by Figure 3. An air jacket is thus provided which ensures proper heating of the chocolate in the kettle without liability of overheating and cooking the same.

In operating the machine, a charge of lumps 33 is placed in the higher compartment 29, at the right of the gate 60, (as viewed in Figures 1 and 2), the gate being pressed against the charge by the spring 70, so that the radial position of the gate depends on the bulk of the charge, a maximum charge holding the gate in approximately the position shown by Figure 2, while a smaller charge holds the gate in approximately the position shown by Figure 1.

More heat is required to melt a maximum charge than is required to melt a smaller charge.

Chocolate consists of a mechanical mixture of solids and a free fat, and this fat, called cocoa butter, tends to rise and separate from the solids. This fact makes it necessary to stir chocolate very thoroughly up to the very instant when the confection center is immersed and withdrawn. If the chocolate is not thus stirred, the coated confection will show white or grayish spots, or streaks of cocoa butter on the coating. This stirring is usually done by the operator by hand, the melted chocolate being accumulated in a puddle on a flat surface or table. The hand stirring has to be repeated after the dipping of a small number of pieces, so that frequent stirring is required. The stirring can be continuously accomplished by a revolving paddle in a stationary kettle, but it is dangerous and inconvenient to dip centers in chocolate contained in a kettle in which a revolving paddle obstructs the kettle. I provide for a constant stirring and avoid the objections to an obstructed kettle, by rotating the kettle, and providing it with the divider 22 and other adjuncts, as described. The induced flow of the melted chocolate constantly stirs it, and the divider provides a dipping space which is practically unobstructed; so that the operator has free unobstructed access to the melted chocolate when dipping the centers therein. The skin friction of the viscous chocolate with the moving surface of the kettle in the compartment 30 induces a flow of chocolate which constantly stirs the mass. The lower and outer layers of chocolate are carried with the moving surface of the kettle until the partition member 22 is encountered when the lower layers are deflected upwardly and the outer layers inwardly. The upward current causes a "swell" on the surface of the pool from the convexed surface of which the chocolate constantly flows off in all directions leaving a considerable patch on the surface of the pool constantly clear of separated lighter constituents of the melted chocolate which tend to collect on the surface and which cause streaks on the coatings if allowed to remain when the centers are dipped.

Of equal importance is a temperature control to keep the pool of melted chocolate at the desired consistency and to supply the correct amount of heat both to maintain such consistency and to melt a continuous fresh supply from the lumps to the correct temperature. The practical problem of melting chocolate in considerable quantities presents difficulties arising from the peculiar character and behavior of chocolate such as is commonly used for confectionery coatings. The chocolate itself is a poor conductor of heat and when lumps of it are heated in a container for the purpose of melting them, the surface layers of the lumps soften into a plastic consistency which melts slowly, is too thick to be removed from the lump by ordinary stirring of the mass, and delays the penetration of heat to the hard centers of the lumps. Unless the container is heated to a point well above the melting point of the chocolate, the melting of the lumps is a very slow operation involving considerable waste of time and heat. For this reason, it has been customary to heat the chocolate to a temperature well above its melting point in order to melt the lumps within a reasonable time, then to cool the melted chocolate to a point near the solidifying temperature which gives the consistency ordinarily desired for dipping centers. This is customarily done by heating the chocolate in one kettle to melt it, then transferring it to other kettles to cool, the dipping being done after the chocolate has been partially cooled. The temperature of the puddles in which the centers are dipped is maintained by frequent additions of super-heated chocolate from the melting kettle. By my invention, I avoid the necessity of super-heating the chocolate by removing from the surface of the lumps the softened or melted chocolate as fast as it is melted. This is supplied to the pool of melted chocolate at the correct temperature and consistency and maintained in the same condition in the pool.

In the operation of the machine the chocolate in the higher compartment 29 of the kettle is melted where the lumps of chocolate come in contact with the moving heated surfaces of the kettle. Since the heat which is used to melt the chocolate is conducted thereto through the walls of the rotating kettle, practically all of the heat is thus applied directly to the surfaces of the chocolate lumps which are in contact with the moving walls of the kettle. Since chocolate is a very poor conductor of heat, the actual melting necessarily takes place almost exclusively on the warmed inner surfaces of the kettle and the surface layers of the chocolate in contact with the kettle walls are continuously scraped off and carried away by the latter as fast as they are softened by the heat therefrom. The softened chocolate scraped from the lumps by the moving kettle walls forms a temporary coating thereon which is carried at once through the crevices 31, 31[a] to the pool in the compartment 30 and blended with the melted chocolate in the pool. The walls of the kettle being heated to the proper degree to maintain the pool of chocolate at the correct consistency, the chocolate as melted from the lumps will be raised directly to that consistency and not first overheated, then cooled, as has been the custom heretofore.

The heating of the kettle has been usually accomplished heretofore, by means of a water jacket, in order to avoid danger of overheating, but as water even in small quantities, will spoil chocolate if mixed with it, I dispense with the use of water and use hot air as the heating medium. In doing this, I merely catch the column of hot air rising from the burner 35 inside the depending flange 82, which is open at the bottom and closed at the top by the kettle. This hot air bath uniformly heats all portions of the kettle, without overheating any portion thereof.

In starting the operation of the machine, the gas cock is fully opened, as shown by Figure 1[a] by a movement of the disk 42 from the position shown by Figures 1 and 4, to that shown by Figure 5. This movement of the disk exerts a pull on the cable 49, and causes the latter to open the gas cock through the arm 50. The disk 42 may be thus turned by hand, or it may be turned by the pull of the weight 46, the brake 71 being manually separated from the disk to permit the weight to act.

The disk 42, when turned to cause the full opening of the gas cock, shown by Figure 1[a], acts through the cable 41 to move the lever 39 and blade 36 to the left hand position shown in dotted lines by Figure 2, this being called the first position. The blade is thus adapted to be acted on, as described later, by melted chocolate in the lower compartment 30, the space in the upper compartment at one side of the swinging gate 60, being charged with lumps 33. I wait until the chocolate is sufficiently melted to permit the rotation of the kettle, and then start the motor. (It is possible to leave the gas burning over night, so that the motor may be started immediately in the morning.) The gas remains fully turned on while the melted chocolate accumulates in the lower compartment 30, and rises into contact with the blade 36.

The rotation of the kettle causes a circulation of the melted chocolate, as indicated by the arrows in Figure 2. The melted chocolate is now in a condition of greater fluidity than that desirable for the formation of a suitable coating. The contact of the moving chocolate with the blade 36, when the latter is in the first position, causes a movement of the blade and the lever 39 from first position to the central position shown by dotted lines in Figure 2, which I call the second position, the lever arm 39 being correspondingly moved and causing movement of the disk 42, to the position shown by Figure 4, thus partly closing the gas cock, as shown by Figure 1[b].

Further rotation of the disk 42, and movement of the blade 36, is prevented by the engagement of the stud or pin 57 with the pendulum 58, the resistance thus offered being sufficient to prevent the reopening of the gas cock.

As the gas is now turned low, the heat generated by the burner is decreased and the melted chocolate is rapidly cooled to the desired condition of viscosity by the natural dissipation or radiation of the heat, and the absorption of heat by the melting of the chocolate in the higher compartment 29. As the melted chocolate is cooled to the desired dipping temperature, the increase of its viscosity causes it to exert more force on the blade 36, when the chocolate is flowing across the blade, as shown by the arrows in Figure 2. This added pull on the blade is sufficient to move the blade and the lever 39 to the position shown by full lines by Figure 2, this being called the third position. This added pull overcomes the resistance of pendulum 58, until the pendulum is swung out to the left as viewed in Figure 4, by the turning of the disk 42, this movement of the pendulum causing a slight increase in the opening of the gas cock, as shown by Figure 1[c], and a corresponding increase of heat. When the lever 39 and the blade are in the third position, the chocolate is in proper condition for dipping.

As the resistance of the pendulum 58 is variable, in accord with its angular distance from the vertical, a state of equilibrium is reached, with varying degrees of viscosity of the chocolate.

As already explained, I provide means of further varying the resistance of the pendulum by sliding the weight 59 up and down thereon, in accord with the quantity of unmelted chocolate lumps in compartment 60, so that the state of equilibrium is modified by this factor, to compensate for the demands for heat of the chocolate being melted.

I further modify the point of equilibrium by providing means for shortening and lengthening the connection between the weight 59 and the gate 60. This is made possible by a sliding ear 69, which can be moved longitudinally in a hole extending through the weight 59, and is held by friction at any point to which it may be moved. I thus provide means of hand regulation, in conjunction with the automatic regulation, thus allowing the chocolate to be run either thick or thin, as is desired, in order to provide the centers with a thick or thin coating. This regulation also compensates for different degrees of heat in the dipping room.

The automatic mechanism for controlling the heat is normally responsive to changes in the viscosity of the melted chocolate, changes in the quantity of melted chocolate in the lower chamber, and changes in the quantity of unmelted chocolate in the upper chamber. During the normal operation of the apparatus, it is assumed that the kettle will be rotated at a substantially constant speed. A change of the speed of rotation would affect the pressure of the current of chocolate on the blade and would thus affect the heat supply.

I claim:—

1. Apparatus of the class described comprising a rotatable kettle, a divider fixed against rotation with said kettle and positioned to divide the space within the kettle into a plurality of compartments, said divider being spaced at one end by a slight clearance from the inner surface of the kettle, and being in scraping contact at its other end with said inner surface.

2. Apparatus of the class described comprising a container member and a partition member positioned within said container member, said partition member having one end thereof slightly spaced from the inner surface of the container member, and the other end thereof in scraping contact with said surface, means for heating said container member, and means for rotating one of said members relatively to the other.

3. Apparatus for preparing solid chocolate for coating confectionery centers, comprising means for maintaining the solid chocolate in contact with a surface moving relatively thereto, means for causing relative motion between said chocolate and said surface, means for heating said surface, and means for scraping said surface after contact with said chocolate.

4. Apparatus of the class described comprising a rotatable container, a partition member therein fixed against rotation therewith dividing the space in the container into two separate compartments, means for rotating said container, means for heating said container, and means operative under normal operating conditions of the apparatus to control said heating means, said controlling means being responsive to changes in a physical characteristic of the material in one of said compartments.

5. Apparatus for preparing solid chocolate for coating confectionery centers, which comprises a rotatable container, a partition member therein fixed against rotation therewith dividing the space within said container into a compartment for solid chocolate and a compartment for melted chocolate, said partition member being positioned with its edge in scraping contact with the inner surface of the rotating container moving from the melted chocolate compartment to the solid chocolate compartment and spaced from the surface moving from the solid chocolate compartment to the melted chocolate compartment, means for rotating said container, means for heating said container, and means operative under normal operating conditions of the apparatus to control said heating means, said controlling means being responsive to changes in the consistency of the chocolate in the melted chocolate compartment.

6. Apparatus for preparing solid chocolate for coating confectionery centers, which comprises a rotatable container, a partition member positioned in said container and fixed against rotation therewith, said partition dividing the space within the container into two compartments for solid and melted chocolate respectively, said partition also having its edges in scraping contact with the inner surfaces of the rotating container which pass from the melted chocolate compartment to the solid chocolate compartment and spaced from the surfaces which pass from the solid chocolate compartment to the melted chocolate compartment, means for rotating said container, means for heating the container, and means operative under normal conditions of operation of the apparatus to control said heating means, said controlling means being responsive both to changes in the consistency of the melted chocolate and changes in the quantity of solid chocolate in the container.

7. A chocolate-preparing machine comprising a rotary kettle having an inclined axis, means for heating the kettle, means for rotating the kettle, and a fixed divider subdividing the kettle into a higher and a lower compartment, the divider being separated at one side of the axis from the kettle, so that melted chocolate may be carried from the higher to the lower compartment, and in contact with the kettle at the opposite side of the axis, so that melted chocolate is prevented from returning to the higher compartment and is automatically stirred, the lower compartment being adapted to permit the dipping of centers therein.

8. A chocolate-preparing machine comprising a rotary kettle having an inclined axis, means for rotating the kettle, a kettle-heating gas burner below the kettle, a fixed divider subdividing the kettle into a higher and a lower compartment and adapted to permit melted chocolate to be carried from the higher to the lower compartment and prevent return of the chocolate to the higher compartment, a gas cock governing the supply of gas to the burner, means tending automatically to close the cock, and means for varying the opening of the cock and thereby regulating the burner flame.

9. A chocolate-preparing machine comprising a rotary kettle having an inclined axis, means for rotating the kettle, a kettle-heating gas burner below the kettle, a fixed divider subdividing the kettle into a higher and a lower compartment and adapted to permit melted chocolate to be carried from the higher to the lower compartment and prevent return of the chocolate to the higher compartment, a gas cock governing the supply of gas to the burner, means tending automatically to close the cock, and means for varying the opening of the cock and thereby regulating the burner flame, said means including an oscillatable blade movable in and by an accumulation of melted chocolate in the lower compartment, and connections between said blade and the cock.

10. A chocolate-preparing machine comprising a rotary kettle having an inclined axis, means for rotating the kettle, a kettle-heating gas burner below the kettle, a fixed divider subdividing the kettle into a higher and a lower compartment and adapted to permit melted chocolate to be carried from the higher to the lower compartment and prevent return of the chocolate to the higher compartment, a gas cock governing the supply of gas to the burner, means tending automatically to close the cock, and means for varying the opening of the cock and thereby regulating the burner flame, said means including a disk adapted to turn on an axis adjacent to the kettle, constantly acting means tending to turn the disk in one direction, a cable connecting the disk with the plug member of the cock, an oscillatory lever having a blade which is movable in and by an accumulation of melted chocolate in the lower compartment, and a cable connecting the lever with the disk.

11. A chocolate-preparing machine comprising a rotary kettle having an inclined axis, means for rotating the kettle, a kettle-heating gas burner below the kettle, a fixed divider subdividing the kettle into a higher and a lower compartment and adapted to permit melted chocolate to be carried from the higher to the lower compartment and prevent return of the chocolate to the higher compartment, a gas cock governing the supply of gas to the burner, means tending automatically to close the cock, and means for varying the opening of the cock and thereby regulating the burner flame, said means including a disk adapted to turn on a support adjacent to the kettle, a cable connecting the disk with the plug member of the cock, an oscillatory lever having a blade which is movable in and by an accumulation of melted chocolate in the lower compartment, a cable connecting the lever with the disk, and a pendulum oscillatable on the axis of the disk, and having a longer arm, a weight on said arm, and a shorter arm contacting with a stud on the disk, the weight being adjustable on the pendulum.

12. A chocolate-preparing machine comprising a rotary kettle having an inclined axis, means for rotating the kettle, a kettle-heating gas burner below the kettle, a fixed divider subdividing the kettle into a higher and a lower compartment and adapted to permit melted chocolate to be carried from the higher to the lower compartment and prevent return of the chocolate to the higher compartment, a gas cock governing the supply of gas to the burner, means tending automatically to close the cock, and means for varying the opening of the cock and thereby regulating the burner flame, said means including a disk adapted to turn on an axis adjacent to the kettle, constantly acting means tending to turn the disk in one direction, a cable connecting the disk with the plug member of the cock, an oscillatory lever having a blade which is movable in and by an accomulation of melted chocolate in the lower compartment, and a cable connecting the lever with the disk, the lever and blade being movable into and out of the kettle, a brake adapted to contact with and prevent movement of the disk, and brake-operating means movable by a movement of the lever and blade in one direction to apply the brake and prevent rotation of the disk, and by a movement of the lever and blade in the opposite direction to separate the brake from the disk.

13. A chocolate-preparing machine comprising a rotary kettle having an inclined axis, means for rotating the kettle, a kettle-heating gas burner below the kettle, a fixed divider subdividing the kettle into a higher and a lower compartment and adapted to permit melted chocolate to be carried from the higher to the lower compartment and prevent return of the chocolate to the higher compartment, a gas cock governing the supply of gas to the burner, means tending automatically to close the cock, and means for varying the opening of the cock and thereby regulating the burner flame, said means including a disk adapted to turn on a support adjacent to the kettle, a cable connecting the disk with the plug member of the cock, an oscillatory lever having a blade which is movable in and by an accumulation of melted chocolate in the lower compartment, a cable connecting the lever with the disk, and a weighted pendulum oscillatable on the axis of the disk, and having a shorter arm contacting with a stud on the disk, the weight being adjustable on the pendulum, the machine comprising also a gate hinged to the divider and pressed by a spring against an accumulation of unmelted chocolate in the higher compartment, and a cable connecting a capstan on the gate with the adjustable weight on the pendulum.

14. A chocolate-preparing machine as specified by claim 13, the said adjustable weight being provided with manually operable means for varying the length of the connection between the weight and the capstan.

15. Apparatus for preparing solid chocolate for coating confectionery centers, which comprises a rotatable container, a partition member therein fixed against rotation therewith dividing the space within said container into a compartment for solid chocolate and a compartment for melted chocolate, said partition member being positioned with its edge in scraping contact with the inner surface of the rotating container moving from the melted chocolate compartment to the solid chocolate compartment and spaced from the surface moving from the solid chocolate compartment to the melted chocolate compartment, means for rotating said container, and means for heating said container.

16. Apparatus of the class described, comprising a member having an element of surface, means for heating said surface to a temperature above the melting point of chocolate, means for bringing said element of surface into and out of contact with solid chocolate whereby a film of melted chocolate is acquired by said surface, and means for subsequently removing said film from said surface and keeping said melted chocolate separate from the unmelted.

In testimony whereof, I have affixed my signature.

PERLEY A. HILLIARD.